(12) United States Patent
Kritchman (10) Patent No.: US 8,147,910 B2
(45) Date of Patent: Apr. 3, 2012

(54) METHOD AND APPARATUS FOR THREE-DIMENSIONAL PRINTING

(75) Inventor: Eliahu M. Kritchman, Tel Aviv (IL)

(73) Assignee: Objet Ltd., Rehovot (IL)

( * ) Notice: Subject to any disclaimer, the term of this patent is extended or adjusted under 35 U.S.C. 154(b) by 401 days.

(21) Appl. No.: 12/391,964

(22) Filed: Feb. 24, 2009

(65) Prior Publication Data

US 2010/0215856 A1    Aug. 26, 2010

(51) Int. Cl.
*B05D 1/28* (2006.01)
*B29C 41/02* (2006.01)

(52) U.S. Cl. .......... 427/258; 264/308
(58) Field of Classification Search .......... 427/258; 264/308
See application file for complete search history.

(56) References Cited

U.S. PATENT DOCUMENTS

| | | | |
|---|---|---|---|
| 6,259,962 B1 | 7/2001 | Gothait | |
| 6,569,373 B2 | 5/2003 | Napadensky | |
| 6,658,314 B1 | 12/2003 | Gothait | |
| 6,850,334 B1 | 2/2005 | Gothait | |
| 7,052,263 B2 | 5/2006 | John | |
| 7,183,335 B2 | 2/2007 | Napadensky | |
| 7,195,472 B2 | 3/2007 | John | |
| 7,209,797 B2 | 4/2007 | Kritchman et al. | |
| 7,225,045 B2 | 5/2007 | Gothait et al. | |
| 7,300,619 B2 | 11/2007 | Napadensky et al. | |
| 7,500,846 B2 | 3/2009 | Eshed et al. | |
| 2001/0028916 A1* | 10/2001 | Akahira | 427/8 |
| 2003/0026896 A1* | 2/2003 | Shinkoda et al. | 427/162 |
| 2004/0207124 A1 | 10/2004 | Kritchman et al. | |
| 2005/0104241 A1 | 5/2005 | Kritchman et al. | |
| 2006/0127153 A1 | 6/2006 | Menchik et al. | |
| 2006/0263705 A1* | 11/2006 | Kim et al. | 430/7 |
| 2007/0179656 A1 | 8/2007 | Eshed et al. | |
| 2009/0020901 A1 | 1/2009 | Schillen et al. | |
| 2009/0304952 A1 | 12/2009 | Kritchman | |

* cited by examiner

*Primary Examiner* — Frederick Parker
(74) *Attorney, Agent, or Firm* — Pearl Cohen Zedek Latzer, LLP (57) ABSTRACT

Embodiments of the invention are directed to a system and method to fabricate three-dimensional objects, layer by layer, by selectively dispensing material from a printing head onto a transfer platform to form a cross-sectional layer of the object that has a pre-determined non-uniform surface. Each layer may then be transferred from the transfer platform to previously formed layers that are carried by a fabrication platform by contacting an exposed surface of a previously formed layer to the layer on the transfer platform.

15 Claims, 6 Drawing Sheets

METHOD AND APPARATUS FOR THREE-DIMENSIONAL PRINTING

BACKGROUND OF THE INVENTION

In three-dimensional (3D) printing, material may be selectively jetted from one or more printing heads and deposited onto a fabrication tray in consecutive layers, for example according to pre-determined image data. Fabrication of the three-dimensional object may include conditioning of each of the layers followed by leveling of each of the layers. The leveling process may be done by a roller or by any other leveling device in order to provide a uniform layer thickness.

Generally, the leveling devices and the technology required to operate these devices may be expensive and may require costly maintenance. In addition, during the leveling process large amounts of waste may accumulate due to the relatively large amounts of materials which may be removed by the leveling device.

BRIEF DESCRIPTION OF THE DRAWINGS

The subject matter regarded as the invention is particularly pointed out and distinctly claimed in the concluding portion of the specification. The invention, however, both as to its organization and method of operation, together with objects, features and advantages thereof, may best be understood by reference to the following detailed description when read with the accompanied drawings in which:

It will be appreciated that for simplicity and clarity of illustration, elements shown in the drawings have not necessarily been drawn accurately or to scale. For example, the dimensions of some of the elements may be exaggerated relative to other elements for clarity or several physical components included in one functional block or element. Further, where considered appropriate, reference numerals may be repeated among the drawings to indicate corresponding or analogous elements. Moreover, some of the blocks depicted in the drawings may be combined into a single function.

DETAILED DESCRIPTION OF EMBODIMENTS OF THE INVENTION

In the following detailed description, numerous specific details are set forth in order to provide a thorough understanding of the invention. However, it will be understood by those of ordinary skill in the art that the present invention may be practiced without these specific details. In other instances, well-known methods, procedures, components and circuits may not have been described in detail so as not to obscure the present invention.

Although embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device which may be included in a printing machine, that may manipulate and/or transform data represented as physical (e.g., electronic) quantities within the computer's registers and/or memories into other data similarly represented as physical quantities within the computer's registers and/or memories or other information storage medium that may store instructions to perform operations and/or processes by the printing machine or elements, parts, modules or units of a printing machine.

Some embodiments of the present invention may be implemented in software for execution by a processor-based system. For example, embodiments of the invention may be implemented in code and may be stored on a computer-storage medium having stored thereon instructions which when executed by a processor may cause a system to perform methods described herein. The computer-storage medium may include, but is not limited to, any type of disk including floppy disks, optical disks, compact disk read-only memories (CD-ROMs), rewritable compact disk (CD-RW), and magneto-optical disks, semiconductor devices such as read-only memories (ROMs), random access memories (RAMs), such as a dynamic RAM (DRAM), erasable programmable read-only memories (EPROMs), flash memories, electrically erasable programmable read-only memories (EEPROMs), magnetic or optical cards, or any type of media suitable for storing electronic instructions, including programmable storage devices.

Such a system may include components such as, but not limited to, one or more central processing (CPU) units or any other suitable multi-purpose or specific processors or controllers, a plurality of input units, a plurality of output units, a plurality of memory units, and a plurality of storage units. Such a system may additionally include other suitable hardware components and/or software components.

Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. For example, "a plurality of printing heads" may include two or more printing heads.

The terms "layer" and "object layer" are used throughout the specification and claims to describe any lamina or film that may represent a cross-section or slice of a 3D object. A layer may be formed on a transfer platform and then transferred from the transfer platform to an exposed surface of previously formed layers carried by a fabrication platform in a "layer by layer" fashion to create, build up or form a three-dimensional (3D) object.

Embodiments of the present invention are directed to a system and a method for printing three-dimensional objects, layer by layer, by selectively dispensing material from a printing head onto a transfer platform, such as tray or rotating belt to form cross-sectional layers of the object. Each dispensed layer may be positioned in a precise required location under the fabrication tray and then the fabrication tray may be lowered toward the dispensed layer to enable transfer of the dispensed layer to the fabrication tray or to an exposed surface of previously dispensed layers transferred to the fabrication tray. According to embodiments of the invention, the newly fabricated layer may be intentionally designed to have a non-uniform surface. The layer may be transferred from the transfer platform to the fabrication tray or to the previously adhered layer carried by the fabrication tray object by contacting, connecting, or pressing together the surface of the fabrication tray or the previously formed layer of the object and the non-uniform surface of the newly dispensed layer.

The terms "X direction" and "Y direction" as used throughout the specification and claims refers to directions on an X-Y plane parallel to the transfer platform, where the X and Y directions are indicative of relative movement between a dispensing head (printing head) or a printing assembly and the platform during selecting dispensing of material from nozzles of the dispensing head onto the platform. The relative movement may be achieved by moving the dispensing head while the platform is kept motionless, by moving the platform, for example a tray of a rotating belt while keeping the dispensing head motionless or by moving both the printing head and the transfer platform. The term "Z direction" as used herein throughout the specification and claims refers to a direction perpendicular to both the X and Y directions. The Z direction is indicative of the direction in which the consecutive layers are formed.

Figure 1:
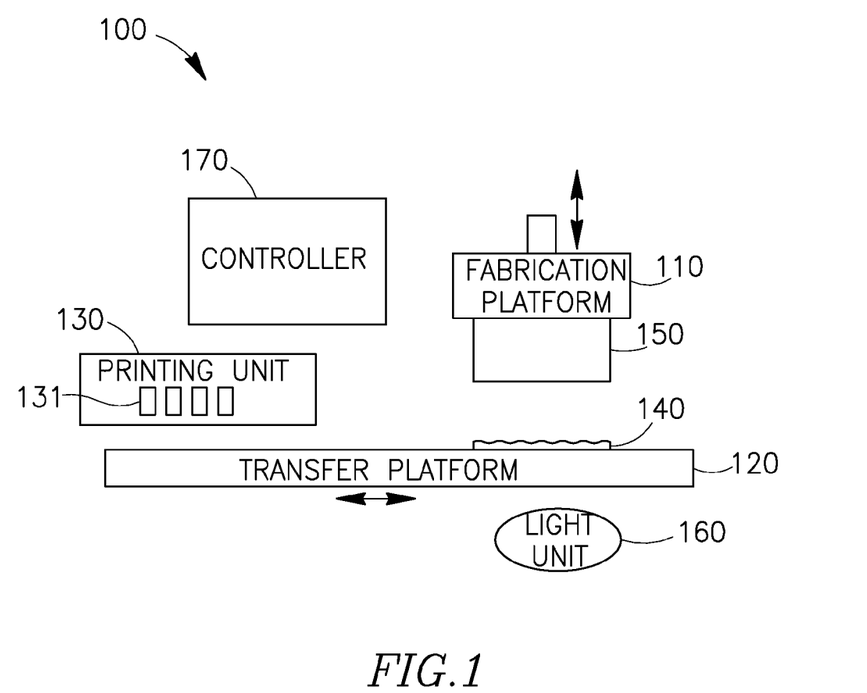
FIGS. 1 and 2 are illustrations of exemplary inkjet printing systems according to embodiments of the invention.
Figure 2:
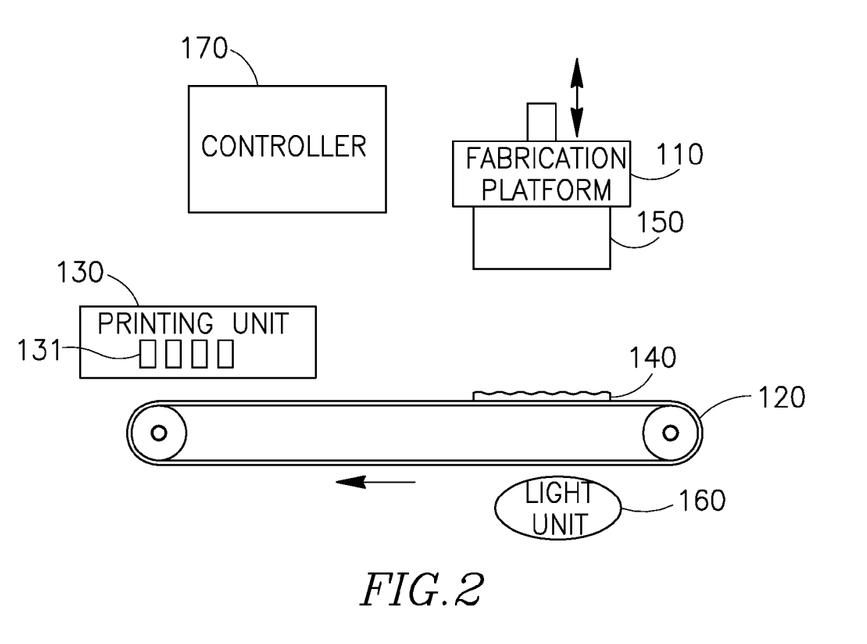

Reference is now made to FIGS. 1 and 2 which are schematic illustrations of exemplary inkjet printing systems according to embodiments of the invention. A printing system 100 may include a fabrication platform, such as tray 110 movable in the Z direction and a transfer platform 120. Fabrication tray 110 may move up and down, in the Z direction, from and to transfer platform 120. As shown in FIG. 1, the transfer platform may be in a form of a tray and as shown in FIG. 2, the transfer platform may be in the form of a rotating belt. Printing system 100 may further include a printing unit 130 having one or more printing heads 131. Each printing head may comprise dispensing nozzles arranged in an array of one or more rows along the longitudinal axis of the printing head. Printing unit 130 may selectively dispense printing material onto transfer platform 120 to form a layer 140 having a non-uniform surface as detailed with respect to FIGS. 3A-3C. Each newly fabricated layer may be designed to have such non-uniform surface.

During printing of the first layer, fabrication platform 110 may be positioned at such a distance from transfer platform 120 so as not to interfere with the printing process. After the first layer is dispensed, the dispensed layer 140 may be shifted to a location precisely below fabrication platform 110. Then, fabrication tray 110 is moved downward in the Z direction to enable the transfer of layer 140 to the surface of fabrication tray 110. Printing system 100 may further include a curing or irradiation source 160 to enable full or partial solidification of a newly printed layer. Fabrication tray 110 may then moved upward disengaging layer 140 from transfer tray 120. The disengagement may be enabled due to the release properties of the top surface of transfer tray 120 in connection to the solidified or semi solidified material of layer 140. Platform 120 may be covered with a surface coating, permanently or before each layer is laid, to enable quick release of each new layer, e.g., layer 140. For example, a permanent release layer such as Teflon™ non-stick coating, silicon permanent coating, or a temporary silicone oil release layer, may be applied to the top of transfer platform 120, the side on which layer 140 is applied.

According to other embodiments, printed layer 140 may remain in a non-solidified state. After the transfer of the printed layer, a new layer may then be dispensed onto transfer platform 120. Then, fabrication tray 110 is moved downward again until the new layer is transferred onto the previous layer. The process, which is described in more details with respect to FIGS. 3A-3C, may continue until all the layers of a three-dimensional object 150 are carried by fabrication tray 110.

Fabrication tray 110 may include a surface to which the first printed layer of object 150 strongly adheres. For example, fabrication tray 110 may comprise a porous surface that increases the adhesion force between the tray and the printed layer or a coating with high adhesion characteristics. For example, fabrication tray 110 may be an aluminum tray with an anodize layer. Alternatively, the tray may include an organic coating, e.g., acrylic coating that may strongly attract the photopolymeric layer of the three-dimensional object. The anodize coating may be porous, enhancing thereby adhesion to the layer by both its material characteristics and the enlarged surface. Other suitable adhesion materials or mechanisms, to securely hold the layers of three-dimensional object 150 may be used. A detailed description of the transfer method according to embodiments of the invention is given with respect to FIGS. 3A-3C.

Irradiation or curing source 160, if used, may be positioned in any position or location in system 100 to allow conditioning and curing of object 150 in the printing process. For example, irradiation source 160 may be positioned below platform 120, as shown in FIG. 1A. In such a configuration transfer platform 120 may be made of an optically transparent material or a material transparent to radiation used for curing, to allow light or radiation emitted from irradiation or curing source 160 to reach the deposited material of layer 140 through platform 120. In other embodiments irradiation or curing source 160 may be positioned in other locations, for example, next to printing unit 130, or above platform 120. In such embodiments platform 120 may be opaque and not necessarily optically transparent to light emitted from irradiation source 160.

In some embodiments, irradiation source 160 may be constantly turned on while in other embodiments, irradiation source 160 may be turned on at certain periods of times. For example, during the transfer of the layer from the transfer platform to the previous layer, or just before contact of the previous layer to the newly deposited layer or at any other suitable time during the process of adhering layer 140 to the previously adhered layer of object 150.

In some embodiments, light emitted from irradiation source 160, also referred to herein as "curing light" may be a generic flood or flash light, or series of flood or flash lights. Any suitable irradiation source 160 that may provide any suitable light for curing or conditioning to the deposited or modeled layers may be used. Curing by methods other than irradiation may be used.

In one embodiment, a flash light source may be used for curing, the flash light may be energized before the model or object 150 may touch or make contact with the new layer 140. Conditioning may be done by lamps located near printing unit 130 before a final curing by a flash lamp or flash lamp may be used twice, a first time before object 150 touches new layer 140 and a second time after object 150 touches new layer 140. In such embodiments, the upper side of layer 140 may have contact with the surrounding air before touching object 150 therefore may be only slightly cured before touching object 150 due to air oxygen inhibition. In some embodiments, layer 140 may be partially cured before touching the former layer of object 150 to allow sticking to the former layer of object 150 and easy releasing of layer 140 from the transfer platform after sticking to object 150.

Printing system 100 may further comprise a processor or controller 170 to control printing unit 130, fabrication tray 110 and transfer tray 120, for example by receiving commands, instructions and information from a system administrator or a user, or by following a program or stored instructions.

Figure 3A:
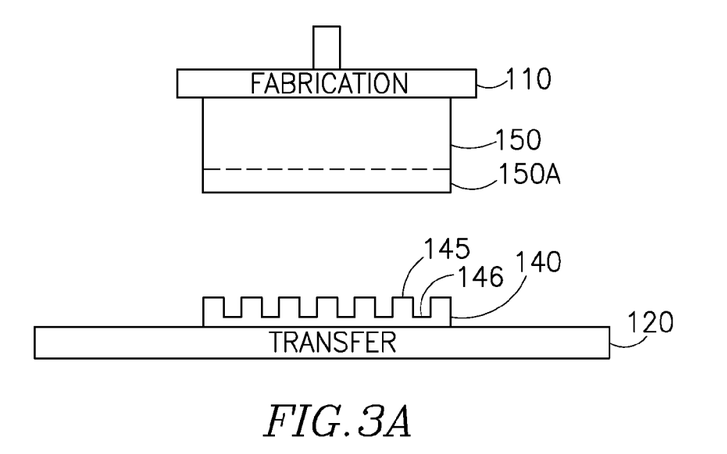
FIGS. 3A-3C are illustrations demonstrating a method of transferring layers during fabrication of a three-dimensional object according embodiments of the invention.
Figure 3B:
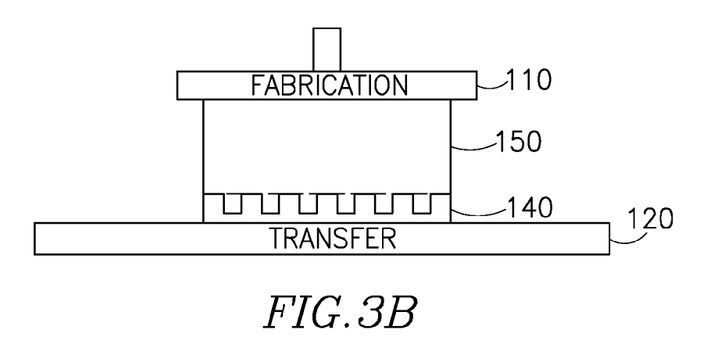
Figure 3C:
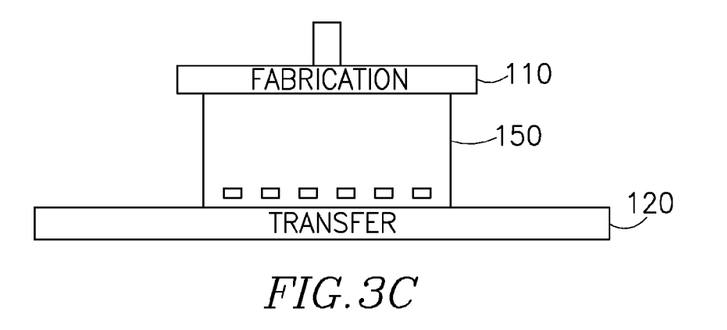

Reference is now made to FIGS. 3A-3C which include illustrations demonstrating a method of transferring layers during fabrication of a three-dimensional object according to embodiments of the invention. According to embodiments of the invention, a deposited layer, such as layer 140 may be designed to have a non-uniform layer thickness. FIG. 3A shows a printed layer 140 before the transfer process starts. A layer thickness (LT) is a parameter that is used to define the height of virtual layer of the digital representation of a three-dimensional object when slicing the object into cross-sectional layers. This value is also used as the incremental Z step ($\Delta Z$) by which the distance between the bottom surface of fabrication tray 110 that carries layers of 3D object 150 and the top surface of transfer platform 120 increases after each layer transfer. Theoretically, the value of LT should be exactly equal to the value of $\Delta Z$. In the real world, however, due to various reasons, including the difference between various nozzles, the actual thickness of a layer is not exactly equal to the theoretical value of LT which is equal to $\Delta Z$ and the actual thickness of the layer may be higher or smaller than the theoretical value of LT.

Still, after each layer transfer, fabrication tray 110 is moved toward transfer platform 120 such that the distance between the platforms is increased by $\Delta Z$ relative to the distance of the previous layer transfer. Accordingly, if for example, the actual thickness of the layer is smaller than the theoretical value of LT, the exposed adhered layer of the 3D object 150 would not touch the newly deposited layer 140 and if for example, the actual thickness of the layer is larger than the theoretical value of LT, the exposed adhered layer of the 3D object 150 would forcibly press the newly deposited layer 14, thereby damaging the layer.

According to embodiments of the invention, layer 140 may be designed to include varying thickness layer. For example, the layer may include scattered spots, such as spot 146 having layer thickness smaller than the incremental Z step (or theoretical LT value) and other scattered spots, such as spot 145 having layer thickness larger than the incremental Z step (or theoretical LT value). As can be seen at FIG. 3A, the lower side of layer 140 that touches the top surface of transfer platform 120 is has a smooth surface and the upper, exposed side has an uneven surface with hills, ridges, bumps, or other varying topographic characteristics resulting in a non-uniform layer thickness.

FIG. 3B illustrates the structure of layer 140 when fabrication tray 110 is moved downward and the initial contact between the exposed layer of 3D object 150 and new layer 140 occurs. At this stage of the transfer process, the difference between the distance that the fabrication tray was moved toward the transfer tray and the distance that the fabrication tray was moved in the previous movement to lift up a previous layer is greater than the designed incremental Z step. Accordingly, as shown in FIG. 3B, the exposed surface of previously formed layer 150a touches only the areas of layer 140 where the layer thickness was designed to be greater that the incremental Z step or the theoretical LT value.

FIG. 3C illustrates the structure of layer 140 when fabrication tray 110 is moved further downward according to the value of the incremental Z step ($\Delta Z$). When the fabrication tray is moved further towards transfer tray 120 until the incremental Z distance between the current Z movement and the previous Z movement has the value of the theoretical layer thickness LT, the top areas 145 may change their shape and may partly fill up spaces, gaps, holes and openings 146 of layer 140. At this stage the layer thickness may be considered to have a value of the theoretical LT, even though there may be small volumes that are not completely filled with material. Further, solidification of the layer may be preformed by irradiation with radiation source 160 or by other methods to strengthen the connection between the previously adhered layers of object 150 and the newly adhered layer 140.

Next, fabrication tray 110 and platform 120 may be moved away one from the other while releasing layer 140 from platform 120. As would be realized by a person skilled in the art, the final thickness of layer 140, being the value of LT may not be dependent on the precise the dispensing rate of printing heads. For example, some vacant areas corresponding to the low points 146 of layer 140 may be remain within the 3D object 150.

Although in the exemplary illustrations of FIGS. 3A-3C fabrication tray 110 is illustrated as positioned above a transfer tray, it should be understood to a person skilled in art that the invention is not limited in this respect and according to embodiments of the present invention any suitable design of inkjet printing system 100 may be used. For example, the transfer platform may be a rotating belt and the fabrication tray may be located below the transfer platform.

Different building materials may be used for building the 3D objects. The building materials may be selectively deposited according to the bitmap of the object being built. For example, each printing head 131 may deposit a different material on platform 120, to create a layer of an object that may comprise a plurality of material types, colors or textures etc.

Building materials or printing materials being deposited by printing heads 131 may include any suitable kind of object building material, such as, for example, photopolymers, wax, powders, plastics, metals, and may include modeling material, support material and/or release material, or any alternative material types or combinations of material types.

The formation of the intentional non-uniform thickness of the printed layer may be achieved in various methods. For example, according to an exemplary embodiment of the invention, the layer may be printing with a plurality of printing heads of which at least one may be a redundant head that prints on the same printing lines as another printing head. Such printing lines would receive twice the amount of material than other printing lines and therefore these areas would have a greater layer thickness.

Figure 4A:
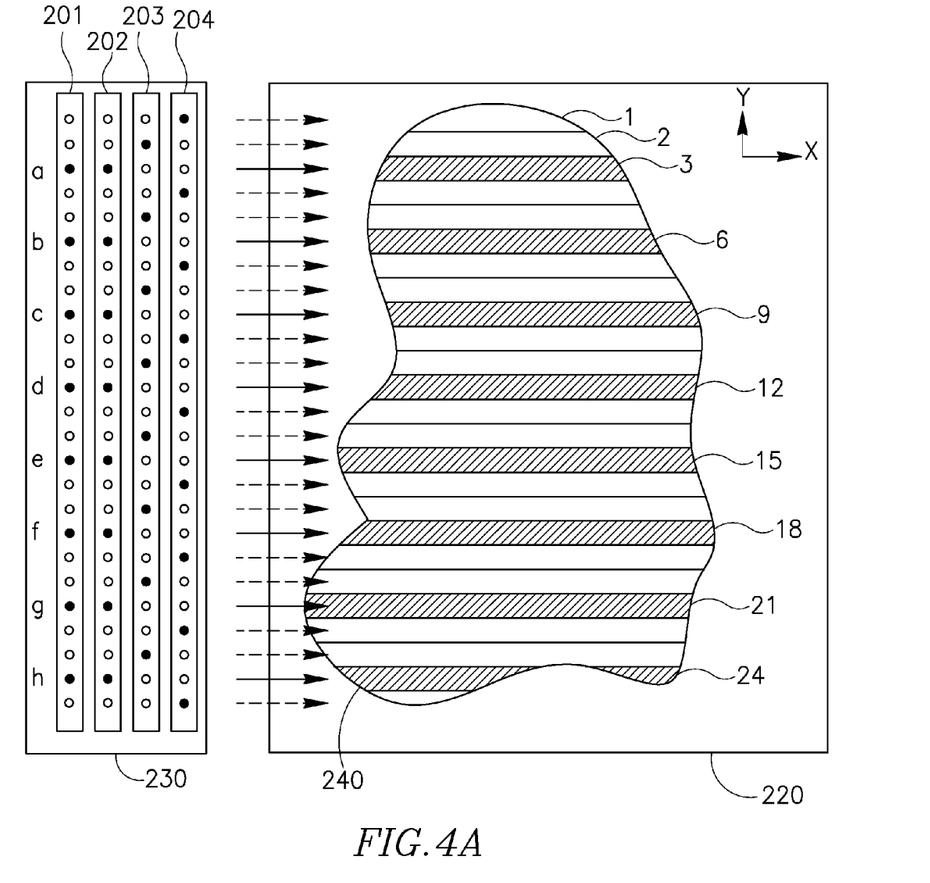
FIGS. 4A and 4B are illustrations demonstrating an exemplary object layer having a pattern of high lines according to embodiments of the invention.
Figure 4B:
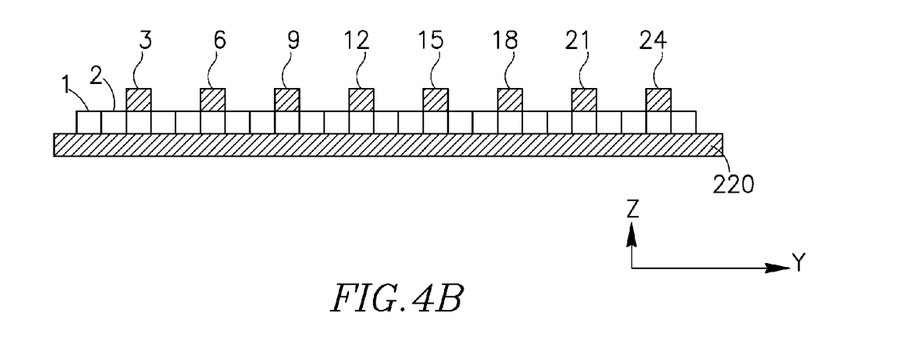

Reference is now made to FIGS. 4A and 4B which are illustrations of an exemplary object layer having an uneven thickness and printed according to embodiments of the invention. Layer 240 may be printed on a transfer platform 220 by dispensing printing material from a printing unit 230. The printing material may be dispensed according to a pre-defined pattern or bitmap by printing heads 201, 202, 203 and 204, where printing head 201 is a redundant printing head that is designed to print on the same printing lines as printing head 202. Each printing head of printing heads 201-204 may include a plurality of dispensing nozzles, for example, nozzles A-H. The predefined bitmap of layer 240 may generate a layer with a non-uniform thickness having a non-smooth, bumpy or uneven surface. Printing material may be dispensed from nozzles in dispensing lines or passes numbered as passes 1-27.

In the exemplary illustration, printing line 1 is printed by a single printing head, namely head 204 and printing line 2 is printed by a single printing head, namely, printing head 203. Printing line 3, however, is printed by both printing head 202 and 201. Accordingly, line 3 would be higher than lines 1 and 2. Likewise both printing head 201 and printing head 202 dispense material to create dispensing lines 6, 9, 12, 15, 18, 21 and 24, which are therefore higher that the other dispending lines.

According to other embodiments of the invention, the non-uniform surface may be produced by dispensing material at different rates according to commands received from a controller or a system administrator. The capability to dispense printing material at different rates may result in dispensing different amounts of printing material from each nozzle and therefore to may enable the generation of hills, valleys and/or other surface topographic characteristics according to a pre-planned pattern or bitmap. According to other embodiments, each layer may be scanned twice, where in a first scan all the required pixels may receive material from the dispensing nozzles wheatears in the second scan only a part of the pixels would receive a second amount of material.

Figure 5:
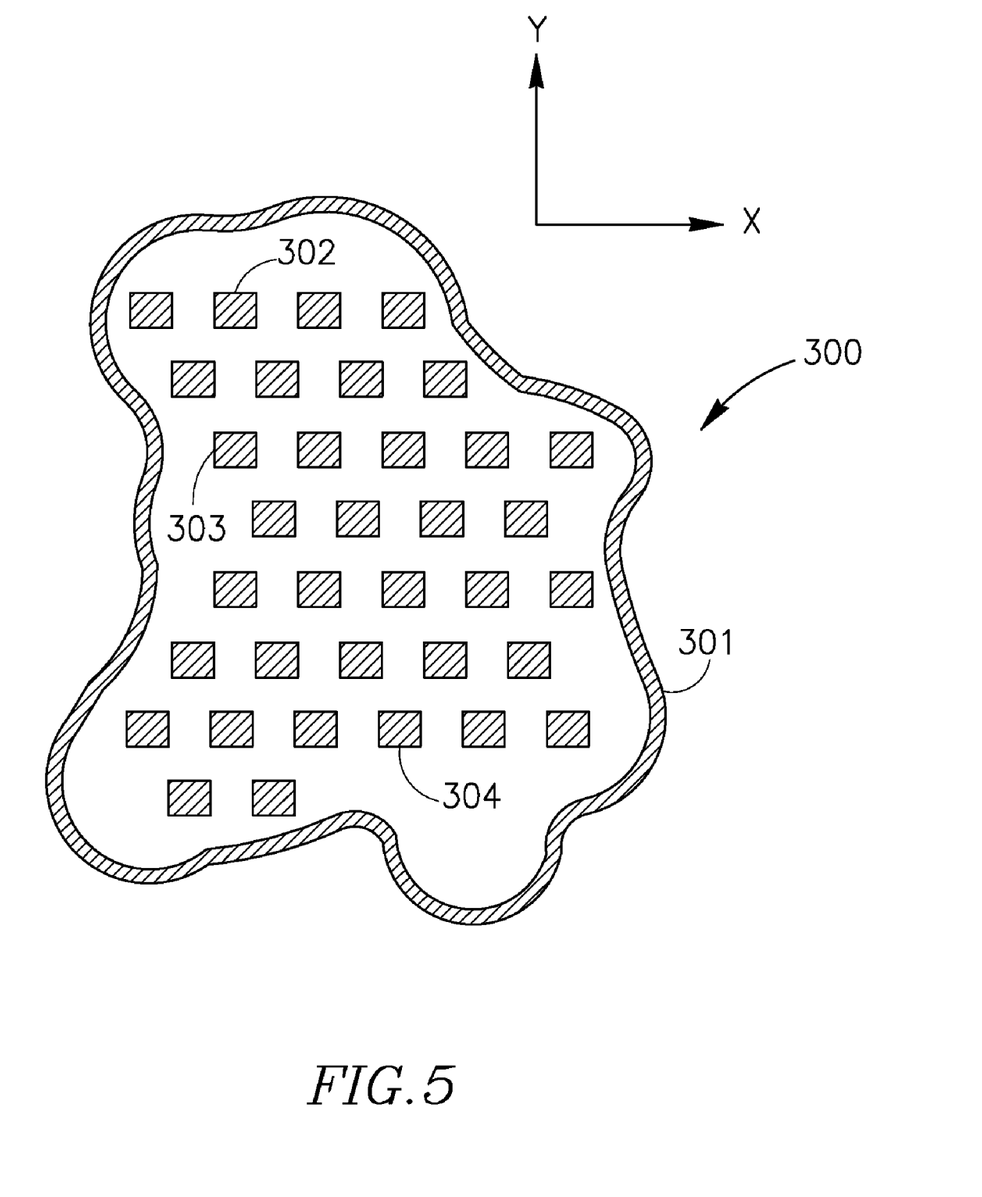
FIG. 5 is an exemplary bitmap illustration demonstrating an object layer having a pattern of high spots and elevated circumference according to embodiments of the invention.

Reference is now made to FIG. 5 which is an exemplary bitmap illustration of an object layer with a non-uniform surface according to embodiments of the invention. An exemplary layer 300 was printed using variable material dispensing rates at different pixels. In this exemplary illustration, the areas marked by diagonal lines, including the circumference 301 and spots 302, 303 an 304, were printed by dispensing material at a high dispensing rate, resulting in higher layer thickness in these areas. Such a high edge or circumference may serve as a blocking wall during the joining of layer 300 to the printed object. Alternatively, the higher areas, such as, for example, portions or pixels 302, 303 and 304 may be created by multiple scanning of layer 300. Printing heads may dispense material in all pixels of a layer during a first run and only in some pixels from the entire pixels in a second run. The layer may be optionally cured by curing radiation before the second run.

Figure 6:
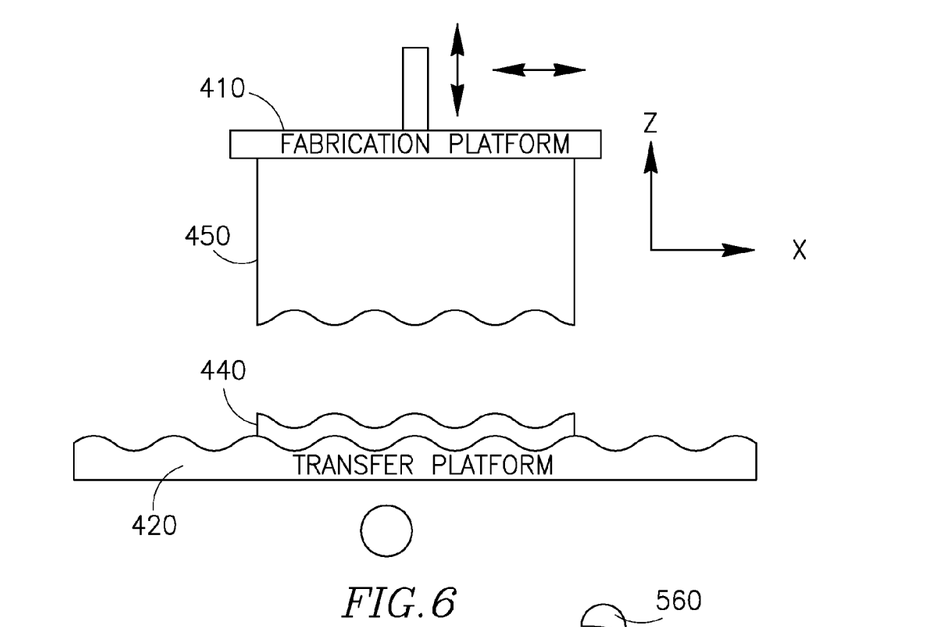
FIG. 6 is an illustration of an exemplary inkjet printing system with a non-smooth transfer platform according to embodiments of the invention.

Reference is now made to FIG. 6 which is an illustration of an exemplary inkjet printing system with a rough or non-smooth transfer platform according to embodiments of the invention. According to some embodiments of the invention, an exemplary three-dimensional object 450 may be formed. In this embodiment, the printing heads dispense material evenly onto a transfer platform 420 having a non flat, rough or coarse top surface. Accordingly, a printed layer 440 that includes a rough, bumpy or uneven top surface reflecting the geometric characteristics of platform 420 may be created.

Before the transfer of layer 440 from transfer platform 420 to a fabrications tray 410, the layer may be located below fabrication tray 410 such that the hills or upper portions of the newly printed layer 420 would substantially coincide with the hills (facing down) of the contacting layer. Object 450 may contact the high points of layer 440 and may press the material such that it would at least fill up part of the spaces, valleys or gaps of layer 440.

According to some embodiments of the invention, the uneven surface of transfer platform 420 may include an ordered coarse surface in x direction, in the y direction, in other directions (e.g., diagonal or at an angle) or in more than one direction, such as both x and y directions. In addition the height of all hills may be equal. According to other embodiments the rough surface of transfer platform 420 may include a random coarse surface in direction X, in direction Y or in both X and Y directions, e.g., the distance between every two adjacent hills may be different and the height of each hill may be different. The roughness may be in the order of approximately 10 microns and the distance between adjacent hills may be approximately 50 microns. Other geometries characteristics may be used.

Embodiments of the present invention may provide a system and a method of 3D printing that eliminate the need for a leveling device. Layers may be dispensed on a transform platform and may have physical characteristics such as thickness and surface shape different than the final characteristics required. The pre-planned design of the layer may include deliberately formed valleys, voids, or gaps so that during attachment of the new layer to the former printed layer the physical characteristics of the layer may be changed by filling up the gaps. For example, curing irradiation may cause the printing material to change its shape, e.g., by melting, and to fill spaces, gaps or holes of the original printed layer or between the new layer and the former layer.

Figure 7:
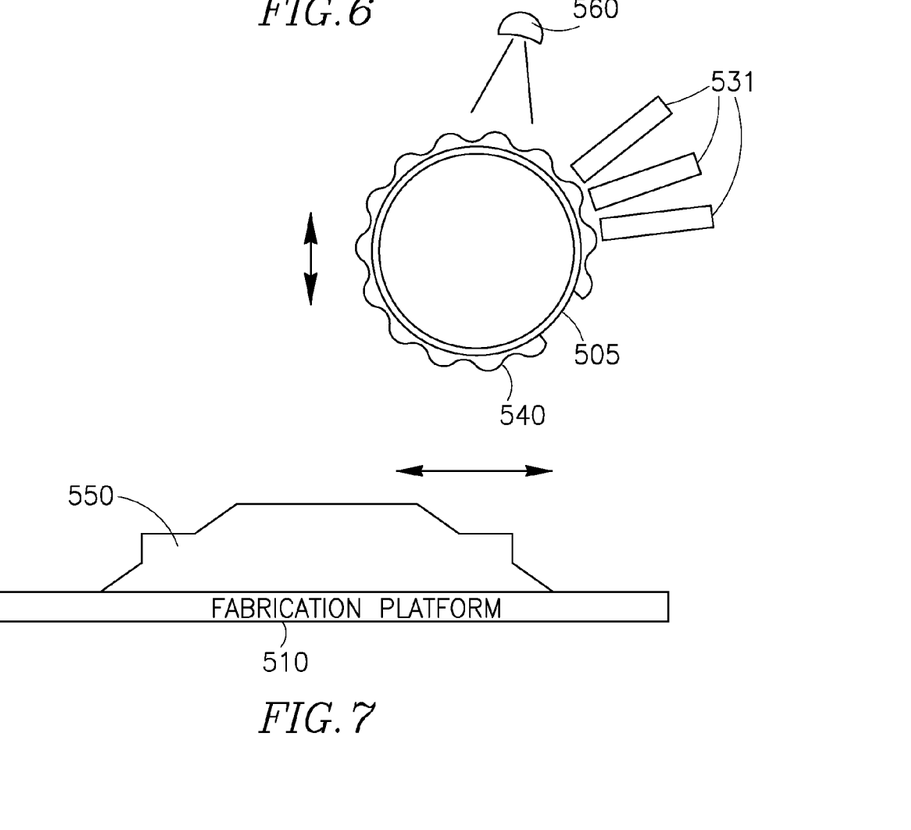
FIG. 7 is an illustration of an exemplary inkjet printing system with an impression roller according to embodiments of the invention.

Reference is now made to FIG. 7 which is an illustration of an exemplary printing system, such as an inkjet printing system, with an impression roller according to embodiments of the invention. An impression roller 505 may be used as a transfer platform on which a new layer 540 may be dispensed by printing heads 531 while roller 505 continuously rotates. When located on roller 505, the outer side of layer 540 may include hills, ridges or other varying topographic characteristics in order to ensure a uniform predetermined thickness of the layer after it adheres to an exemplary 3D object 550 without using a leveling device. When layer 540 contacts a top layer of object 550 the higher points of layer 540 may change their shape, expand and may at least partially fill up spaces and gaps within layer 540. Layer 540 may be partially or fully solidified before or during transfer to object 550. Release from impression roller 505 may made possible, for example, due to a release characteristics of the outer surface of impression roller 505.

According to some embodiments, a plurality of revolutions of roller 505 may be required for fabricating a complete layer before the layer, e.g., layer 540 may be ready to be transferred to object 550. For example, when the spacing between adjacent nozzles of printing heads 531 in the Y direction is smaller than the spacing between the rows of pixels in the bitmap of the layer or when the length of printing head 531 in Y direction is shorter than the length of layer 540.

After completion of printing layer 540 on roller 505, a transfer process may take place as follows: Firstly, the height in Z direction of a fabrication tray 510 may be adjusted to be lower than the lowest point of roller 505 by a gap that equals to the layer thickness LT. Then, a linear movement may be provided between tray 510 and roller 505 that causes layer 540 to contact the top layer of object 550 and to be transferred from the roller to the object. The velocity of the linear movement and the rotation movement of roller 505 may be adjusted to ensure that roller 505 would roll on tray 510 without slippage and with minimal linear friction. It should be noted that the rotational velocity of roller 505 during the transfer of layer 540 may not necessarily be equal to the velocity during the printing of the layer on the roller surface.

The angle of rotation may be synchronized with the relative movement between tray 510 and roller 505 in a way that the new layer 540 may be attached to the required X position on object 550. In some embodiments, roller 505 may continue rotating in the same direction during the transfer process as well as during fabrication of layer 540. In other embodiments tray 510 may change movement direction from layer to layer, requiring thereby roller 505 to reverse its rotation direction.

Embodiments of the invention may be suitable also for printing wax objects. In such embodiments curing lamp may not be required, however, the transfer platform, on which each layer is deposited before transferring to the object, may be preferably heated to an optimal temperature, e.g., close to the glass temperature of the wax, in order to prevent too fast cooling of the wax before contact with the object. The roll of transparent platform may be taken by a rotating belt while the objects may be hung on a table that faces down or lying on a table that faces up.

According to embodiments of the invention, the use of a roller or another leveling device may be eliminated and therefore material waste may not be part of the printing process. In some embodiments no support material may be required, e.g., when an object includes negative slops. However, in other embodiments, a leveling device may be used.

Figure 8:
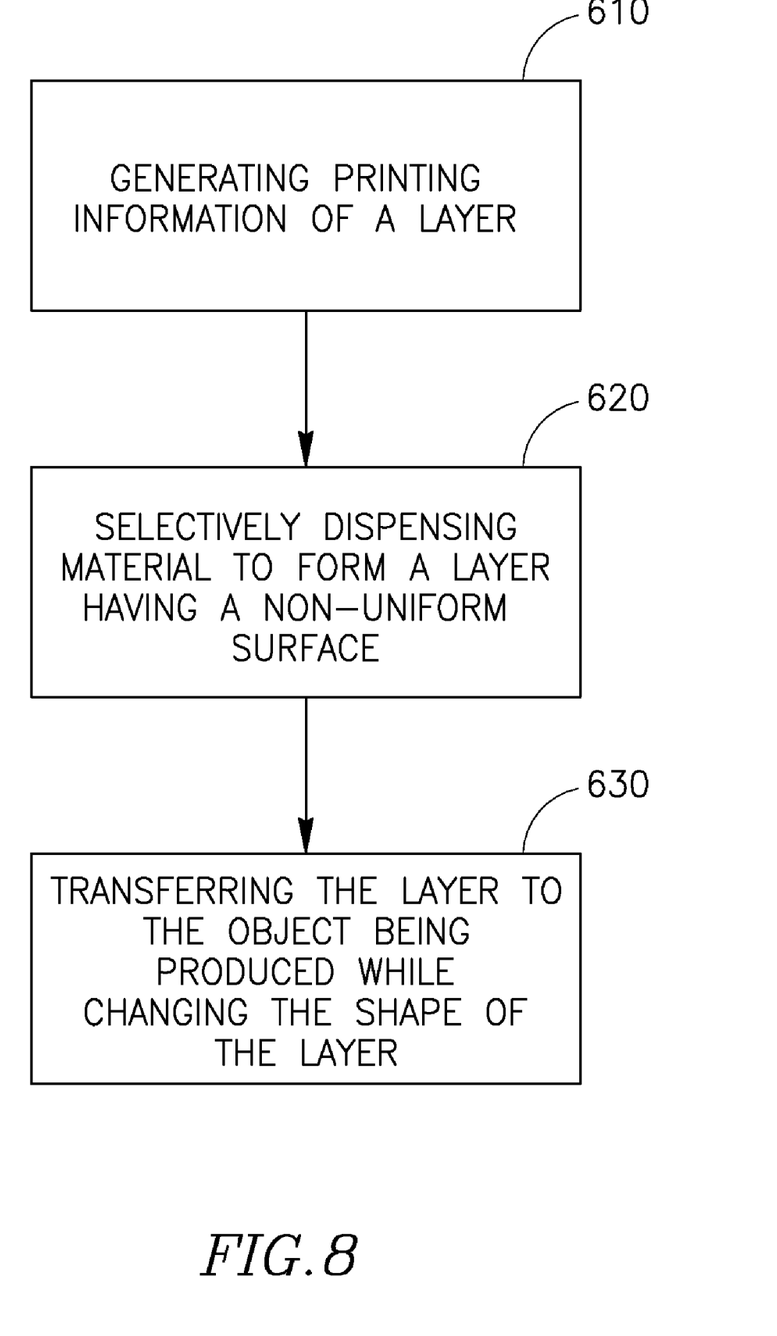
FIG. 8 is a flow chart of a method for three dimensional printing in accordance with some embodiments of the present invention.

Reference is now made to FIG. 8, which is a schematic flow chart illustration of a method for three dimensional printing in accordance with some embodiments of the present invention. Operations of the method may be implemented, for example, by system 100 of FIG. 1, and/or by other suitable printing devices, and/or printing systems.

As indicated at box 610, the method may include generating or creating printing information of a cross-sectional layer of a three-dimensional object such that the layer may have a predetermined non-uniform surface. Such generation may be carried out by a controller such as controller 170. The printing information may be pre-generated and stored until used. The printing information may include rules, commands or any other plans or instructions which may result in selectively dispensing material from a printing head, e.g., printing head 131 of FIG. 1, onto a transfer platform, e.g., platform 120 of FIG. 1, to form the cross-sectional layer such that the non-uniform surface of the layer may comprise voids, hills and valleys, bumps or any other form of rough surface or non-uniform topographic characteristics as further indicated at box 620.

Embodiments of the invention may include generating a cross sectional layer of a three-dimensional object having a non-uniform surface by generating a layer having a non-uniform thickness. Generating printing information may include defining the layer by a matrix of pixels and while dispensing material may comprise dispensing different amounts of material at some of the pixels such as to create the non-uniform surface of the layer. The non-uniform surface of the layer may be formed by dispensing material at a variable flow rate as well.

As indicated at box 630, the method may include transferring the layer from the transfer platform to the three-dimensional object being produced by for example contacting or connecting a surface of a previously formed layer of the object and the non-uniform surface of the layer. While contacting, the non-uniform surface may change its shape such that the hills, peaks or high points of the layer may melt, expand and may fill up spaces, gaps, voids or valleys in the being formed layer such that the after attachment the three-dimensional object may include a uniform cross sectional layers.

According to embodiments of the invention, a printing system may include a processor, controller or any suitable computing device (e.g., controller 170), such as a microprocessor or a processor to control the printing process. Such a computing device may include installed software and/or hardware to enable a user to execute a printing process as described in embodiments of the invention. A computing device may include a memory, central processing unit processor (CPU), monitor, storage device, an operating system, input device(s) and output device(s). According to embodiments of the invention, input devices may include a mouse, a keyboard or any suitable input devices and output devices may include one or more displays, speakers and/or any other suitable output devices. The storage device may be any suitable storage device, e.g., a hard disk or any machine-readable storage medium having stored thereon instructions that when executed by a processing platform, result in generating printing information of a cross-sectional layer of a three-dimensional object such as to create a non-uniform surface of the layer, selectively dispensing material from a printing head onto a transfer platform to form the cross-sectional layer having non-uniform surface and transferring the layer from the transfer platform to the object being produced by contacting a surface of a previously formed layer of the object and the non-uniform surface of the layer.

While certain features of the invention have been illustrated and described herein, many modifications, substitutions, changes, and equivalents may occur to those of ordinary skill in the art. It is, therefore, to be understood that the appended claims are intended to cover all such modifications and changes as fall within the true spirit of the invention.

What is claimed is:

1. A method of producing, layer by layer, three-dimensional objects, the method comprising:
   selectively dispensing material, layer by layer, from a printing head onto a transfer platform, each layer corresponding to a cross section of a three-dimensional object to be formed;
   transferring, layer by layer, each layer from the transfer platform to a fabrication platform prior to depositing a subsequent layer on the transfer platform until the three-dimensional object is formed,
   wherein a deposited layer is designed to have a non-uniform thickness.

2. The method of claim 1, wherein the non-uniform thickness eliminates the need for use of a leveling device prior to transferring the deposited layer to the fabrication platform.

3. The method of claim 1, wherein the deposited layer is designed to have scattered areas having a thickness smaller than an incremental step by which a distance between a bottom surface of the fabrication platform and a top surface of the transfer platform increases after each layer transfer, and other areas having a thickness larger than an incremental step.

4. The method of claim 1, wherein the non-uniform thickness of the layer is formed by dispensing the material at different rates.

5. The method of claim 1, comprising dispensing the material based on printing information for the deposited layer such that the deposited layer is defined by a matrix of pixels and wherein selectively dispensing material comprises dispensing different amounts of material at different of pixels.

6. The method of claim 1, wherein the deposited layer comprises a non-uniform surface in the form of peaks and valleys.

7. The method of claim 6, wherein the peaks and valleys are formed by dispensing material from the printing head at a variable flow rate.

8. The method of claim 6, wherein the peaks and valleys are formed by dispensing material from the printing head at a plurality of passes.

9. The method of 1, wherein the material is a photopolymer.

10. The method of 1, wherein the material is a wax material.

11. The method of 1, wherein a non-uniform surface of the deposited layer becomes uniform as a result of contacting the non-uniform surface to a surface of a previously formed layer, wherein the previously formed layer is carried by the fabrication platform.

12. The method of 1, wherein a portion of material from the peaks is squeezed into the valleys during attachment of the deposited material to a previously formed layer.

13. The method of 1, wherein the deposited layer is designed such that the thickness in a circumference of the deposited layer is larger than the thickness in adjacent areas.

14. The method of 1, wherein said layer is at least partially solidified before being transferred.

15. The method of 1, wherein said layer comprises more than one dispensed material.

* * * * *